(12) United States Patent
Edwards

(10) Patent No.: US 8,810,358 B2
(45) Date of Patent: Aug. 19, 2014

(54) PROXIMITY DETECTION FOR KIOSK PAYMENT

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 197 days.

(21) Appl. No.: 13/369,701

(22) Filed: Feb. 9, 2012

(65) Prior Publication Data

US 2013/0207772 A1  Aug. 15, 2013

(51) Int. Cl.
*G05B 23/02* (2006.01)

(52) U.S. Cl.
USPC .......................................................... 340/3.7

(58) Field of Classification Search
USPC .................. 340/3.7, 10.1, 3.1, 5.1; 235/375
See application file for complete search history.

(56) References Cited

U.S. PATENT DOCUMENTS

| 5,695,038 | A  | * | 12/1997 | Keith et al. | 194/206 |
| 6,536,658 | B1 | * | 3/2003  | Rantze       | 235/375 |
| 7,720,711 | B2 | * | 5/2010  | Taylor       | 705/16  |
| 2002/0099604 | A1 | * | 7/2002 | Lewis et al. | 705/14  |

* cited by examiner

*Primary Examiner* — Vernal Brown
(74) *Attorney, Agent, or Firm* — Joseph P. Mehrle

(57) ABSTRACT

Techniques for proximity detection of kiosk payments are provided. A kiosk system includes a cash/coin acceptor device and an added sensor. The sensor detects when a hand of a customer is in proximity to the cash/coin acceptor device indicating cash or coins are about to be inserted into the device. The sensor coordinates with a state of the kiosk system and when the state permits and the hand is in proximity to the device, the device is activated or enabled to accept the cash or coins for a transaction of the customer.

20 Claims, 3 Drawing Sheets

PROXIMITY DETECTION FOR KIOSK PAYMENT

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

Self-Service terminal kiosks that accept cash and coins generally require application level control over when the currency accepting devices are enabled for accepting inputs (notes and coins) and when they are disabled from accepting input. For example, when an item has been successfully purchased and (if necessary) bagged, then the cash devices might be enabled for input allowing the shopper to quickly begin finalization by directly inserting cash/coins rather than going through a series of touch screen interactions that enable the system to accept cash. Likewise, when the self-service system is busy with operations such as responding to security condition then the cash devices may need to be disabled to prevent the shopper from beginning a finalization process by inserting notes/coins.

Most self-service applications enable/disable the cash input devices each time an item is scanned at the self-service kiosk. This ensures that money cannot be accepted (forcing a start of finalization) until the itemization bagging operation is completed successfully. After the item is bagged in self-checkout, the cash devices are re-enabled for the possible insertion of notes/coin. As such, the cash input devices are typically disabled/enabled once for each item scanned.

When a coin device in particular is disabled, it must not accept money, instead returning inserted coins immediately (if not directly) to the shopper. Traditionally, this involves the use of a mechanical diverter that directs inserted coins to a return shoot instead of into the device accepter.

Unfortunately these mechanical diverters are subject to wear and have a limited life span of 2 to 3 million cycles. When self-checkout lanes handle 250 transactions per day and each transaction on average sells 10 items, then over 365 days the cash input devices may be cycled over 900,000 times/year and rapidly reach their end of life of 2-3 million cycles.

SUMMARY

In various embodiments, techniques for proximity detection of kiosk payments are presented. According to an embodiment, a method for proximity detection for kiosk payment is provided.

Specifically, a hand or currency is detected at a sensor of the kiosk system. Next, that the hand or currency is determined to be within a predefined distance of a currency accepting device. Then, a state of the kiosk system is obtained and a decision is made as whether to activate the currency accepting device based on the state and the hand or currency being within the predefined distance of the currency accepting device and before the currency is inserted into the currency accepting device.

DETAILED DESCRIPTION

Figure 1:
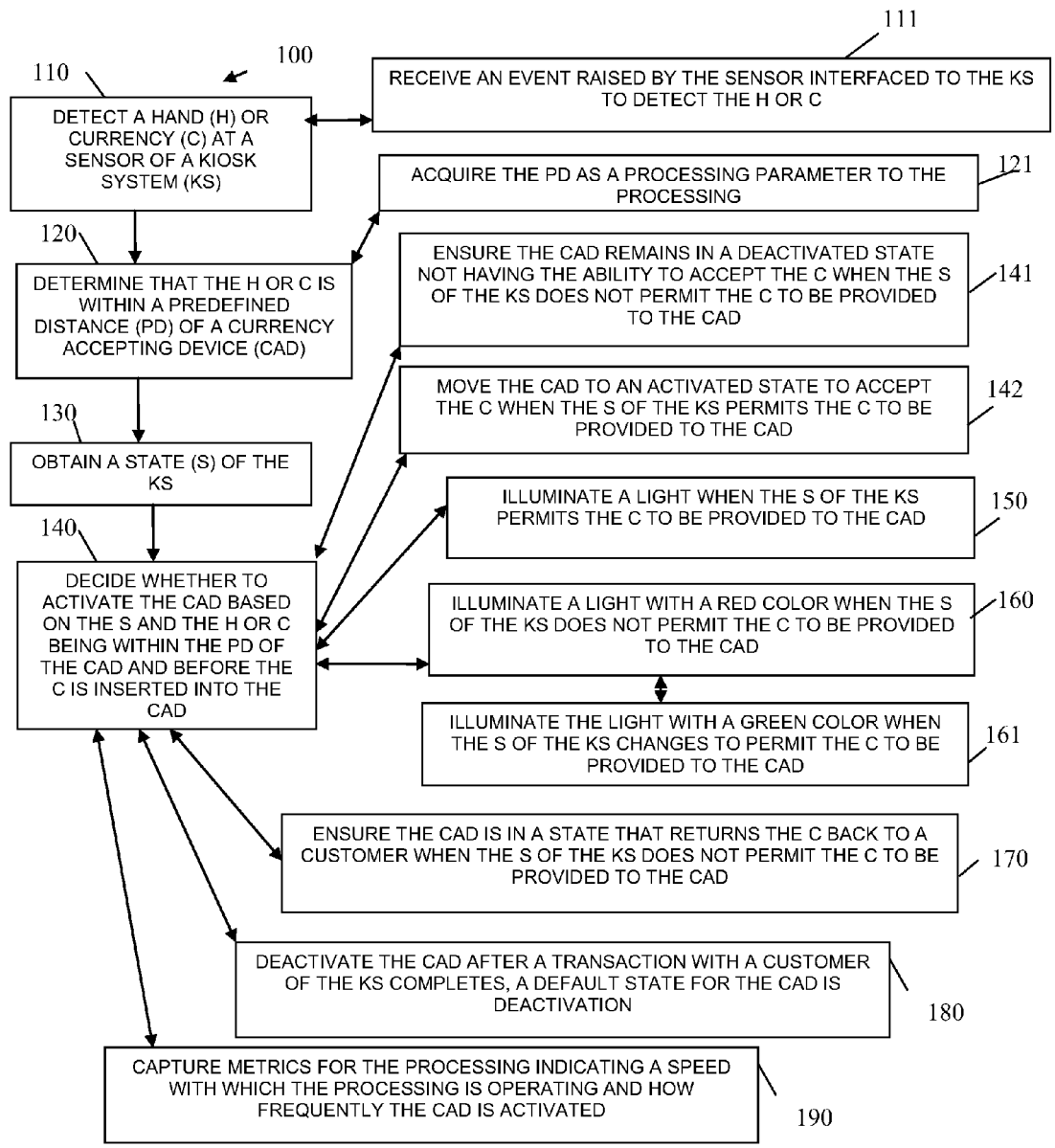
FIG. 1 is a diagram of a method for proximity detection for kiosk payment, according to an example embodiment.

FIG. 1 is a diagram of a method 100 for proximity detection for kiosk payment, according to an example embodiment. The method 100 (hereinafter "payment detector") is implemented as instructions programmed and residing on a non-transitory computer-readable (processor-readable) storage medium and executed by one or more processors. The processors are specifically configured and programmed to process the payment detector. The payment detector may also operate over a network. The network is wired, wireless, or a combination of wired and wireless.

The payment detector executes on one or more processors of a kiosk system. A kiosk system includes a variety of devices, such as display, perhaps touch screen, scanner, card swipe device, and cash/coin accepter device.

As will be demonstrated more completely herein and below, the techniques presented remove the need for a self-service application to repeatedly enable/disable cash input devices on the expectation that coins/notes may be inserted. Instead, the devices are used left in the disabled state and a separate proximity sensor is added near the note and coin input slots.

So, when a shopper reaches to insert notes or coins into the cash input devices the proximity sensor detects the incoming hand/currency and signals the application software that the shopper may be attempting to insert notes/coins. The software responds by checking the state of the application and if payment is permissible in the current state then enables the cash/coin devices. It is noted that this is done before the customer can fully insert the cash/coins.

As an example, assume a detection sensor with a 30 mm detection distance, which costs about $2.00 and has a detection time of less than 100 milliseconds (ms). Further, assume the velocity of a hand is 40 cm per second for free motion plus 150 ms to align a coin/note with the slot and insert it.

Using the example metrics, the minimum detection time becomes 30 cm detection distance/100 cm/sec velocity of the hand in free motion*1000 ms/sec+150 ms to align/deposit coin/note into accepter=450 ms.

Thus, the minimum circuit response time includes the sensor detection time plus the system interrupt latency plus the device enable time. For the existing example, the Detection time (100 ms)+interrupt latency (10 ms)+Device Enable time (100 ms) totaling 210 ms; well within the minimum detection time for successfully enabling the device(s) before the coin is inserted.

With this approach, the repeated enable/disable for each item is eliminated and instead the enablement of cash/coin devices becomes interrupt driven based on the detection of the hand approaching the cash input devices conditioned by the software's state allowing note/coin inputs.

In some embodiments, the same proximity sensor assembly can house a visual indicator LED or bezel illumination used to signal that the notes/coins may be inserted at this time even though the cash input devices will not actually be enabled until the shopper attempts to insert notes/coins. This provides an indication to the shopper that when the illumination, is say green, cash or coins can be inserted and when the illumination, is say red, cash or coins cannot be inserted based on a state of the self-service kiosk at any given point in time.

The proposed circuitry and arrangements have the effect of allowing cash devices to stay disabled by default and only be enabled when and actual note/coin insertion event is detected. This reduces the number of enable/disable cycles from 1 per item to 1 every 3 transactions; about the percentage of transactions that are finalized with cash as opposed to credit or debit.

The reduction on device enable/disable cycles is dramatic, since the device need only respond to actual cash insertion attempts. For the case of 250 transaction*10 items/day there would be 2500 enable/disable operation per day. Reducing that to 250 transactions*33% of transactions that use cash (on average) means only 83 enable/disable cycles; a 97% reduction over what is conventionally done.

Furthermore, the same circuitry and arrangements presented can be used for other input devices, such as Magnetic Strip Readers (MSRs) again allowing the device to only be enabled when the swiping of a card is imminent.

Also, the circuitry and arrangements presented can also accommodate illuminations to signal the shopper that use of the device would be allowed at a particular point in time. This eliminates the need for devices to include visual enable illuminators.

The payment detector is now discussed with reference to the FIG. 1.

At 110, the payment detector detects a hand or currency at a sensor of a kiosk system. The sensor can be a light based sensor that detects when a hand is in a field or breaks one or more beams of light. In another case, the sensor can be a camera that uses image processing to detect the hand or currency relative to fixed objects in view of the camera. Other techniques can be used as well to detect the hand with different types of sensors calibrated to recognize the hand or the currency.

According to an embodiment, at 111, the payment detector receives an event raised by the sensor, which is interfaced to the kiosk system for purposes of detecting the hand or the currency.

At 120, the payment detector determines that the hand or the currency is within a predefined distance of a currency accepting device. The currency accepting device can be a coin/cash accepting device or can be a magnetic strip reader (in this instance the currency is a credit card, a gift card, or a debit card).

According to an embodiment, at 121, the payment detector acquires the predefined distance as a processing parameter or set environmental processing environment value for the payment detector.

At 130, the payment detector obtains a state of the kiosk system. The state can be a flag indicating that the kiosk is prepared to accept currency for a current transaction or that the kiosk is not prepared to accept currency for the current transaction. In other cases, the state can be more than two values (binary) and can include a variety of states, each state mapping to whether the kiosk system is prepared or not prepared to receive currency for the current transaction with the customer.

At 140, the payment detector decides whether to activate the currency accepting device based on the state and based on the hand or the currency being within the predefined distance of the currency accepting device. This decision by the payment detector occurs before the customer's hand actually reaches the currency accepting device (before the currency is actually inserted into the currency accepting device). In other words, the payment detector processes in milliseconds and an algorithm for calibrating the payment detector was presented above.

According to an embodiment, at 141, the payment detector ensures the currency accepting device remains in a deactivated state not having the ability (inability) to accept the currency when the state of the kiosk system does not permit the currency to be provided to the currency accepting device.

In another situation, at 142, the payment detector moves the currency accepting device to an activated state to accept the currency when the state of the kiosk system permits the currency to be provided to the currency accepting device.

According to an embodiment, at 150, the payment detector illuminates a light when the state of the kiosk system permits the currency to be provided to the currency accepting device.

In another scenario, at 160, the payment detector illuminates a light with a red color when the state of the kiosk system does not permit the currency to be provided the currency accepting device.

Continuing with the embodiment of 160 and at 161, the payment detector illuminates the light with a green color when the state of the kiosk system changes to permit the currency to be provided to the currency accepting device.

In yet another case, at 170, the payment detector ensures the currency accepting device is in a state that returns the currency back to a customer when the state of the kiosk does not permit the currency to be provided to the currency accepting device.

In an embodiment, at 180, the payment detector deactivates the currency accepting device after a transaction with a customer of the kiosk system completes. Here, a default state for the currency accepting device is deactivation.

In another situation, at 190, the payment detector captures metrics for the payment detector indicating a speed with which the payment detector is operating and how frequently the currency accepting device is activated to accept currencies.

Figure 2:
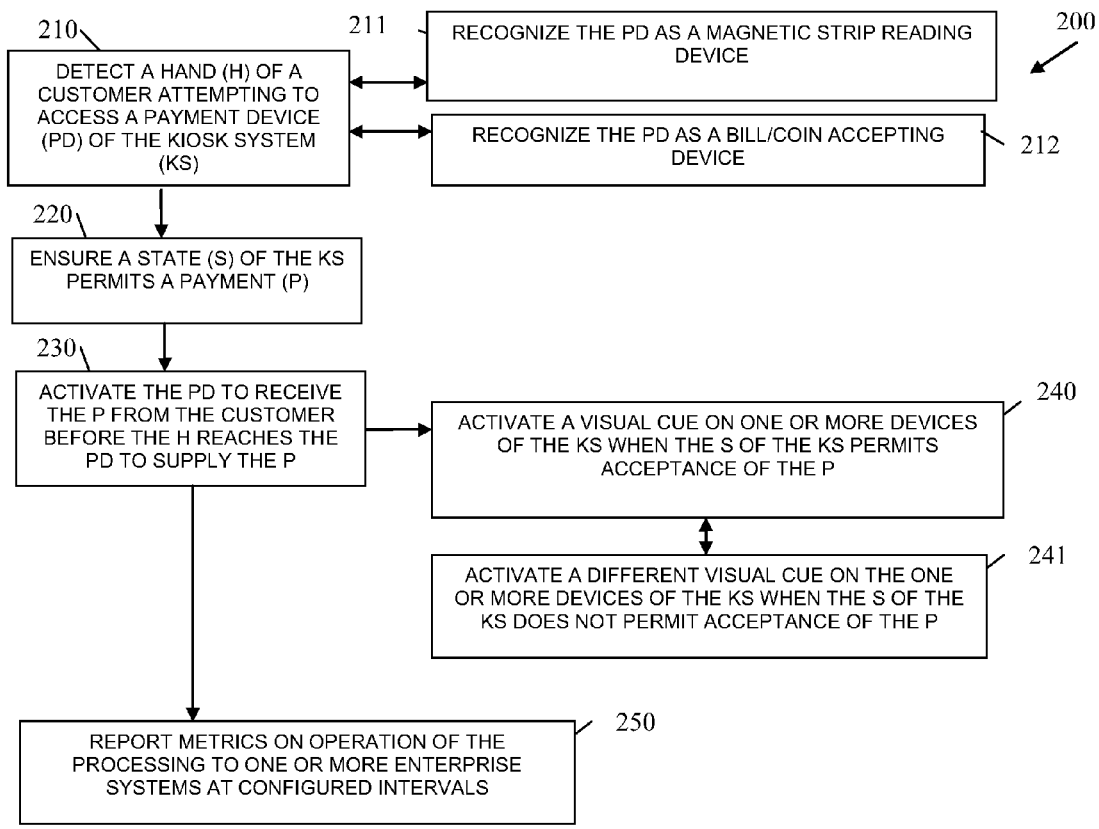
FIG. 2 is a diagram of another method for proximity detection for kiosk payment, according to an example embodiment.

FIG. 2 is a diagram of another method 200 for proximity detection for kiosk payment, according to an example embodiment. The method 200 (hereinafter "kiosk payment sensor") is implemented as instruction and programmed within a non-transitory computer-readable (processor-readable) storage medium that executes on one or more processors of a kiosk system (e.g., display, perhaps touch screen, card swipe device, a cash/coin accepter device, etc.); the processors of the kiosk system are specifically configured to execute the kiosk payment sensor. The kiosk payment sensor may also be operational over a network; the network is wired, wireless, or a combination of wired and wireless.

The kiosk payment sensor presents another and in some ways enhanced processing perspective of the payment detector represented by the method 100 and discussed above with reference to the FIG. 1.

At 210, the kiosk payment sensor detects a hand of a customer attempting to access a payment device of a kiosk system.

According to an embodiment, at 211, the kiosk payment sensor recognizes the payment device as a magnetic strip reading (MSR) device.

In another case, at 212, the kiosk payment sensor recognizes the payment device as a bill/coin accepting device.

It is noted that the kiosk system can include both a MSR device and a bill/coin accepting device so that for one transaction with the kiosk system the kiosk payment sensor detects the hand approaching the MSR device but for another transaction with the kiosk system the kiosk payment sensor detects the hand approaching the bill/coin accepting device.

At 220, the kiosk payment sensor ensures a state of the kiosk system permits a payment via the payment device.

At 230, the kiosk payment sensor activates the payment device to receive the payment from the customer before the hand reaches the payment device to supply the payment.

According to an embodiment, at 240, the kiosk payment sensor activates a visual cue on one or more devices of the kiosk system when the state of the kiosk system permits acceptance of the payment.

Continuing with the embodiment of 240 and at 241, the kiosk payment sensor activates a different visual cue on the one or more devices of the kiosk system when the state of the kiosk system does not permit acceptance of the payment.

In yet another scenario, at 250, the kiosk payment sensor reports metrics on operation of the kiosk payment sensor to one or more enterprise systems at configured intervals.

Figure 3:
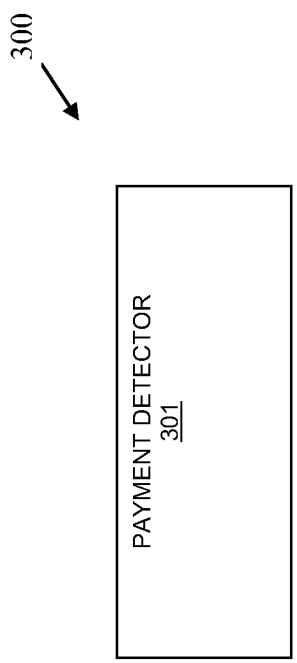
FIG. 3 is a diagram of kiosk payment detection system, according to an example embodiment.

FIG. 3 is a diagram of kiosk payment detection system 300, according to an example embodiment. The components of the kiosk payment detection system 300 are implemented as executable instructions and programmed within a non-transitory computer-readable (processor-readable) storage medium that execute on one or more processors of a kiosk system (e.g., self-service kiosk and component devices, etc.); the processors of the kiosk system are specifically configured to execute the components of the kiosk payment detection system 300. The kiosk payment detection system 300 may also be operational over a network; the network is wired, wireless, or a combination of wired and wireless.

The kiosk payment detection system 300 includes a payment detector 301.

The kiosk payment detection system 300 includes a kiosk system having one or more processors that execute the payment detector 301, which is implemented, programmed, and resides within a non-transitory computer-readable storage medium. Example processing associated with the payment detector 301 was presented above in detail with reference to the FIGS. 1 and 2 (kiosk payment sensor).

The payment detector 301 is configured to interact with a sensor device of the kiosk system to determine when a customer is attempting to make a payment to a payment device of the kiosk system and determines whether to keep the payment device deactivated or to activate the payment device based on the payment attempt and a state of the kiosk system.

In an embodiment, the payment device is a magnetic strip reading device or a bill/coin accepting device.

In an embodiment, the sensor is a camera or a light-based sensing mechanism that detects a hand of the customer being present within a predefined field of the payment device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a kiosk system configured to execute the method, comprising:
   detecting currency at a sensor of the kiosk system;
   determining that the currency is within a predefined distance of a currency accepting device;
   obtaining a state of the kiosk system; and
   deciding whether to activate the currency accepting device based on the state and the currency being within the predefined distance of the currency accepting device and before the currency is inserted into the currency accepting device.

2. The method of claim 1, wherein detecting further includes receiving an event raised by the sensor interfaced to the kiosk system to detect the currency.

3. The method of claim 1, wherein determining further includes acquiring the predefined distance as a processing parameter to the method.

4. The method of claim 1, wherein deciding further includes ensuring the currency accepting device remains in a deactivated state not having the ability to accept the currency when the state of the kiosk system does not permit the currency to be provided to the currency accepting device.

5. The method of claim 1, wherein deciding further includes moving the currency accepting device to an activated state to accept the currency when the state of the kiosk system permits the currency to be provided to the currency accepting device.

6. The method of claim 1 further comprising, illuminating a light when the state of the kiosk system permits the currency to be provided to the currency accepting device.

7. The method of claim 1 further comprising, illuminating a light with a red color when the state of the kiosk system does not permit the currency to be provided to the currency accepting device.

8. The method of claim 7 further comprising, illuminating the light with a green color when the state of the kiosk system changes to permit the currency to be provided to the currency accepting device.

9. The method of claim 1 further comprising, ensuring the currency accepting device is in a state that returns the currency back to a customer when the state of the kiosk system does not permit the currency to be provided to the currency accepting device.

10. The method of claim 1 further comprising, deactivating the currency accepting device after a transaction with a customer of the kiosk system completes, a default state for the currency accepting device is deactivation.

11. The method of claim 1 further comprising, capturing metrics for the method indicating a speed with which the method is operating and how frequently the currency accepting device is activated.

12. A processor-implemented method programmed in a non-transitory processor-readable medium and to execute on one or more processors of a kiosk system configured to execute the method, comprising:

detecting currency of a customer attempting to access a payment device of the kiosk system;

ensuring a state of the kiosk system permits a payment; and activating the payment device to receive the payment from the customer before the currency reaches the payment device to supply the payment.

13. The method of claim 12, wherein detecting further includes recognizing the payment device as a magnetic strip reading device.

14. The method of claim 12, wherein detecting further includes recognizing the payment device as a bill/coin accepting device.

15. The method of claim 12 further comprising, activating a visual cue on one or more devices of the kiosk system when the state of the kiosk system permits acceptance of the payment.

16. The method of claim 15 further comprising, activating a different visual cue on the one or more devices of the kiosk system when the state of the kiosk system does not permit acceptance of the payment.

17. The method of claim 12 further comprising, reporting metrics on operation of the method to one or more enterprise systems at configured intervals.

18. A system comprising:

a kiosk system configured with a payment detector that executes on one or more processors of the kiosk system, and the payment detector is implemented and resides in a non-transitory computer-readable storage medium;

wherein the payment detector interacts with a sensor device of the kiosk system to determine when a customer is attempting to make a payment to a payment device of the kiosk system by detecting the currency and determines whether to keep the payment device deactivated or to activate the payment device based on the payment attempt and a state of the kiosk system.

19. The system of claim 18, wherein the payment device is a magnetic strip reading device or a bill/coin accepting device.

20. The system of claim 18, wherein the sensor is a camera or a light-based sensing mechanism that detects the current of the customer being present within a predefined field of the payment device.

* * * * *